United States Patent
An

(10) Patent No.: US 6,926,419 B2
(45) Date of Patent: Aug. 9, 2005

(54) BACKLIGHT UNIT STRUCTURE FOR LIQUID CRYSTAL DISPLAY

(75) Inventor: Chi Wook An, Kyoungki-do (KR)

(73) Assignee: Boe-Hydis Technology Co., Ltd., Kyoungki-do (KR)

(*) Notice: Subject to any disclaimer, the term of this patent is extended or adjusted under 35 U.S.C. 154(b) by 71 days.

(21) Appl. No.: 10/634,392

(22) Filed: Aug. 5, 2003

(65) Prior Publication Data

US 2004/0047141 A1 Mar. 11, 2004

(30) Foreign Application Priority Data

Aug. 5, 2002 (KR) .............................. 10-2002-0046034

(51) Int. Cl.⁷ ............................................. G01D 11/28
(52) U.S. Cl. ..................... 362/29; 362/282; 362/296; 362/561
(58) Field of Search ..................... 362/31, 269, 271, 362/277, 281–287, 296, 560–561, 29

(56) References Cited

U.S. PATENT DOCUMENTS

| | | | | |
|---|---|---|---|---|
| 2,346,988 A | * | 4/1944 | Noel ............................ | 355/88 |
| 3,538,322 A | * | 11/1970 | Arsem .......................... | 362/19 |
| 4,074,124 A | * | 2/1978 | Maute et al. ................. | 362/217 |
| 4,229,783 A | * | 10/1980 | Eberhardt .................... | 362/352 |
| 4,287,531 A | * | 9/1981 | Mitamura et al. ........... | 348/813 |
| 4,714,983 A | * | 12/1987 | Lang ............................ | 362/27 |
| 4,739,454 A | * | 4/1988 | Federgreen ................. | 362/133 |
| 4,855,818 A | * | 8/1989 | Morimoto et al. .......... | 358/512 |
| 4,899,175 A | * | 2/1990 | Harada et al. ............... | 347/238 |
| 4,907,862 A | * | 3/1990 | Suntola ........................ | 349/61 |
| 4,920,410 A | * | 4/1990 | Tomii et al. ................. | 348/796 |
| 4,991,070 A | * | 2/1991 | Stob ............................. | 362/223 |
| 5,038,259 A | * | 8/1991 | Katoh et al. ................. | 362/256 |
| 5,040,101 A | * | 8/1991 | Aspenwall ................... | 362/125 |
| 5,477,423 A | * | 12/1995 | Fredriksz et al. ............ | 362/31 |
| 5,510,965 A | * | 4/1996 | Teakell ........................ | 362/223 |
| 5,889,366 A | * | 3/1999 | Yokokawa et al. ......... | 313/607 |
| 6,002,452 A | * | 12/1999 | Morgan ....................... | 348/742 |
| 6,031,330 A | * | 2/2000 | Yoshida et al. ............. | 313/607 |
| 6,186,649 B1 | * | 2/2001 | Zou et al. .................... | 362/347 |
| 6,232,963 B1 | * | 5/2001 | Tew et al. ................... | 345/204 |
| 6,292,594 B1 | * | 9/2001 | Iwai ............................ | 382/298 |
| 6,369,523 B2 | * | 4/2002 | Matsuura et al. ........... | 315/291 |
| 6,535,187 B1 | * | 3/2003 | Wood ........................... | 345/84 |
| 6,573,882 B1 | * | 6/2003 | Takabayashi ............... | 345/102 |
| 6,583,579 B2 | * | 6/2003 | Tsumura .................... | 315/169.3 |
| 6,614,185 B1 | * | 9/2003 | Nishimura et al. ......... | 313/607 |
| 6,693,619 B1 | * | 2/2004 | Miura et al. ................. | 345/102 |
| 6,791,527 B2 | * | 9/2004 | Yoshinaga et al. .......... | 345/102 |
| 6,815,904 B2 | * | 11/2004 | Choi ........................... | 315/169.3 |
| 2002/0057238 A1 | * | 5/2002 | Nitta et al. ................... | 345/87 |

FOREIGN PATENT DOCUMENTS

| | | | | |
|---|---|---|---|---|
| JP | 63200102 | * | 8/1988 | ............ G02B/6/00 |
| JP | 04147127 | * | 5/1992 | ............ G03B/27/10 |
| JP | 2000111909 | * | 4/2000 | ......... G02F/1/1335 |

* cited by examiner

Primary Examiner—Stephen Husar
Assistant Examiner—Jason Han
(74) Attorney, Agent, or Firm—Ladas & Parry LLP

(57) ABSTRACT

Disclosed is a backlight unit structure for an LCD (Liquid Crystal Display). The backlight unit structure comprises: a lamp disposed under a display panel; and a reflection plate rotatably disposed around the lamp and having an opening through which light can be concentrated on the display panel. The blink backlight having the reflection plate is applied to backlight unit structure, so that it is possible to improve a response time, to enhance an image quality of the moving picture similarly to the existing CRT, and to obtain a high luminance as well.

11 Claims, 5 Drawing Sheets

(a)

(b)

(a)

(b)

(c)

BACKLIGHT UNIT STRUCTURE FOR LIQUID CRYSTAL DISPLAY

BACKGROUND OF THE INVENTION

1. Field of the Invention

The present invention relates to a backlight unit for a liquid crystal display (LCD), and more particularly to a backlight unit structure for a liquid crystal display having a blink backlight structure provided with a reflection plate to allow for improvement of a response time and accomplishment of a high luminance.

2. Description of the Prior Art

In order to improve a response time in an LCD, a technique using a high-speed response liquid crystal has been employed in general. In addition, the response time may be further improved by utilizing the panel structures such as a VA (Vertical Alignment) panel structure, an IPS (In Plane Switch) panel structure, an OCB (Optically Compensated Bend) panel structure and so forth, rather than a typical TN (Twisted Nematic) panel structure. Yet another technique of improving the response time may be to select a driving method such as a CCD driving method over others.

Even though the above-mentioned various techniques have been used to improve the response time, it has been impossible to acquire the same response time as a CRT (Cathode Ray Tube).

This results from a display principle of the CRT, which is based on an impulse light emission system. That is, the CRT is displayed by emitting light once (2–3 ms) a frame (16.7 ms, 60 Hz).

However, because the LCD emits light in succession (16.7 ms) during one frame, a blur phenomenon is generated while the LCD is displayed, unlike the CRT. In particular, in the case of a moving picture, a serious mismatch phenomenon wherein image signals are mismatched with the eyes of a user is generated from the LCD. This mismatch phenomenon is a common phenomenon found not only in an LCD but also in display devices using a method of steadily emitting light, such as a plasma display panel (PDP) and an electroluminescence (EL) display.

As shown in FIGS. 1a and 1b, an impulse system is realized by providing a plurality of lamps 13 in a backlight module 11 disposed under a display panel 15, and then by performing a sequential turning on/off according to a principle similar to that in a CRT display.

Here, to obtain a satisfactory display image quality, the sequential turning on/off is synchronized with a gate signal at the same time. In other words, as in FIG. 2, lamps 13 located under a gate line become on-state when the gate signal is applied to the gate line, while the lamps 13 become off-state when the gate signal is not applied to the gate line. That is, the on-state of the lamps 13 is gradually shifted from the upper side of the display to the lower side thereof.

According to research data of Hitachi Inc., when the sequential turning on/off mode is used in a blink backlight system having six lamps, a luminance is reduced at 16% compared with a system in which the lamps are continuously turned on. When a duty time of the lamp is set to 60%, luminance of 60% can be obtained.

As the duty time becomes shorter, a trade-off relationship ensues, in which a moving picture becomes clearer but the luminance becomes reduced. The research data of Hitachi Ltd. reports that a minimum duty time for reducing the blur phenomenon in a moving picture of an LCD is 70%.

Further, as a tube current of a typical luminous body (CFL (Color Cathode Fluorescent Lamp)) is growing high, a temperature of the lamp is increased, and thus an efficiency of the luminance is decreased.

In the blink backlight system, because the off-state of the lamp prevents the temperature of the lamp from increasing, there is a room to increase the tube current compared with the lamp in a steady on-state, so that the luminance can be increased.

SUMMARY OF THE INVENTION

Accordingly, the present invention has been made to solve the above-mentioned problems occurring in the prior art, and an object of the present invention is to provide a backlight unit structure for an LCD having a blink backlight structure mounted with a reflection plate, so as to improve a response time and to obtain a high luminance.

In order to accomplish this object, there is provided a backlight unit structure for an LCD (Liquid Crystal Display), comprising: a lamp disposed under a display panel; and a reflection plate rotatably disposed around the lamp and having an opening through which light can be concentrated on the display panel.

BRIEF DESCRIPTION OF THE DRAWINGS

The above and other objects, features and advantages of the present invention will be more apparent from the following detailed description taken in conjunction with the accompanying drawings, in which:

FIG. 1a is a top view of a blink backlight for an LCD according to the prior art;

FIG. 1b is a cross-sectional view taken along line Ib—Ib of FIG. 1a;

FIG. 3a is a top view of a blink backlight having a reflection plate in accordance with the present invention;

FIG. 3b is a cross-sectional view taken along line IIIb—IIIb of FIG. 3a;

FIG. 3c is a magnified view of part A of FIG. 3b;

DETAILED DESCRIPTION OF THE PREFERRED EMBODIMENTS

Figure 1:
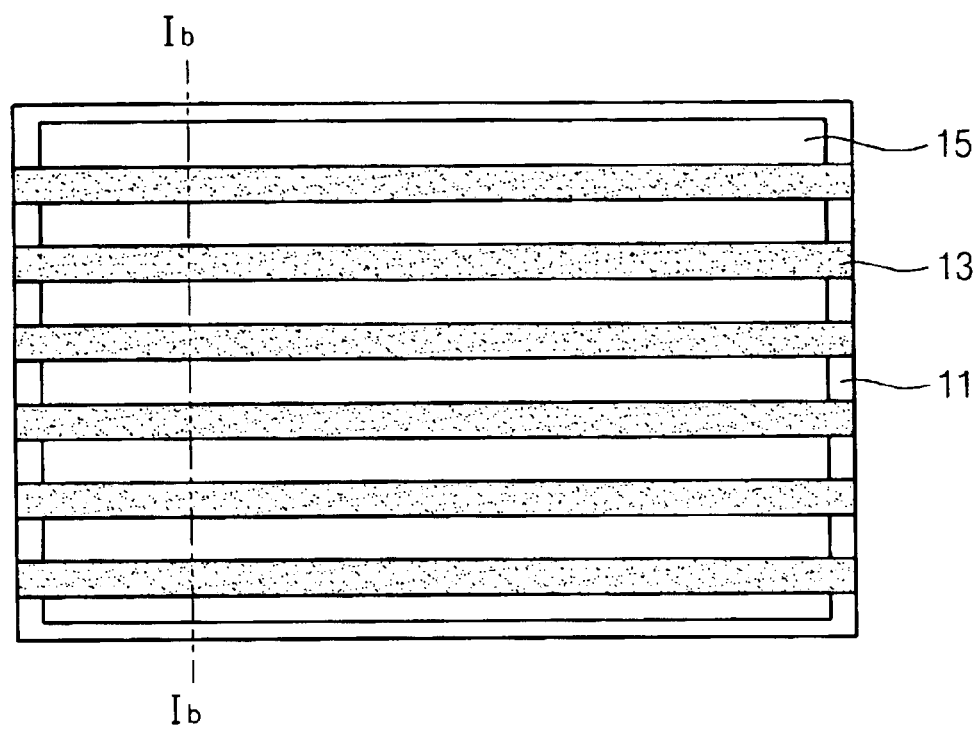
Figure 1:
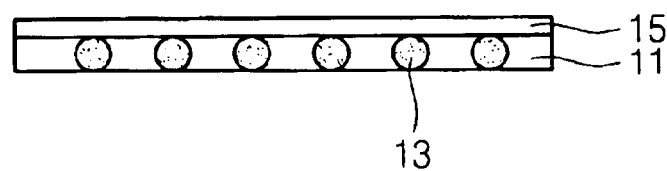
Figure 2:
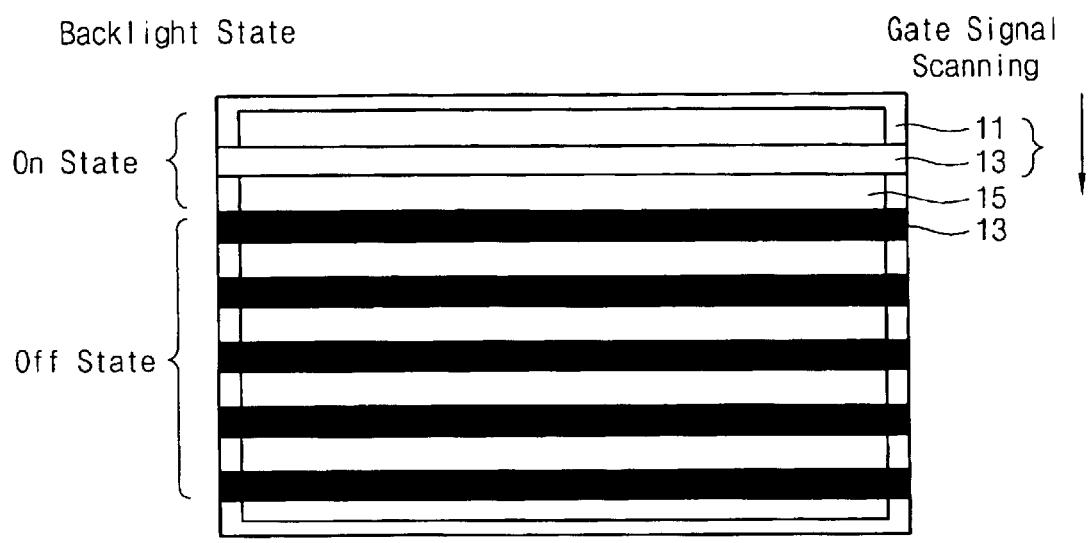
FIG. 2 is a schematic view for explaining a driving principle of a blink backlight for an LCD of FIG. 1.
Figure 2:
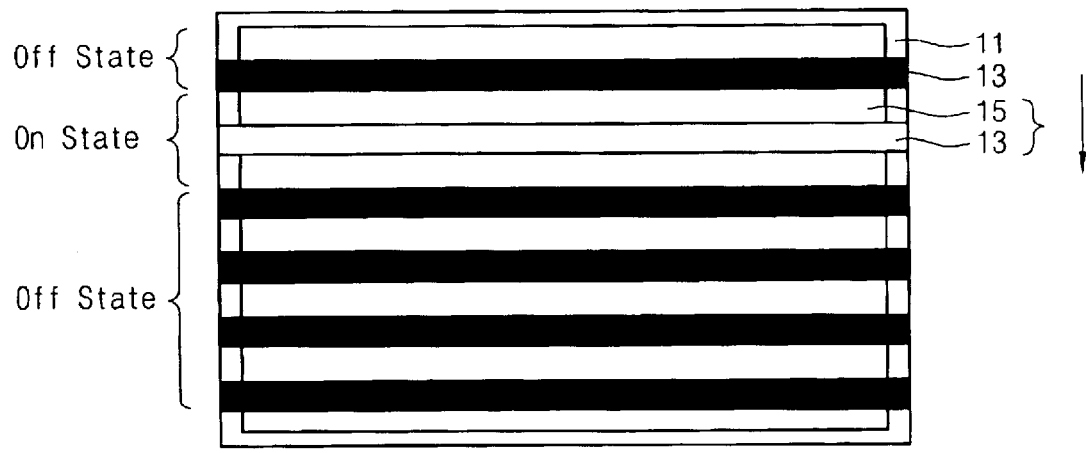

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3:
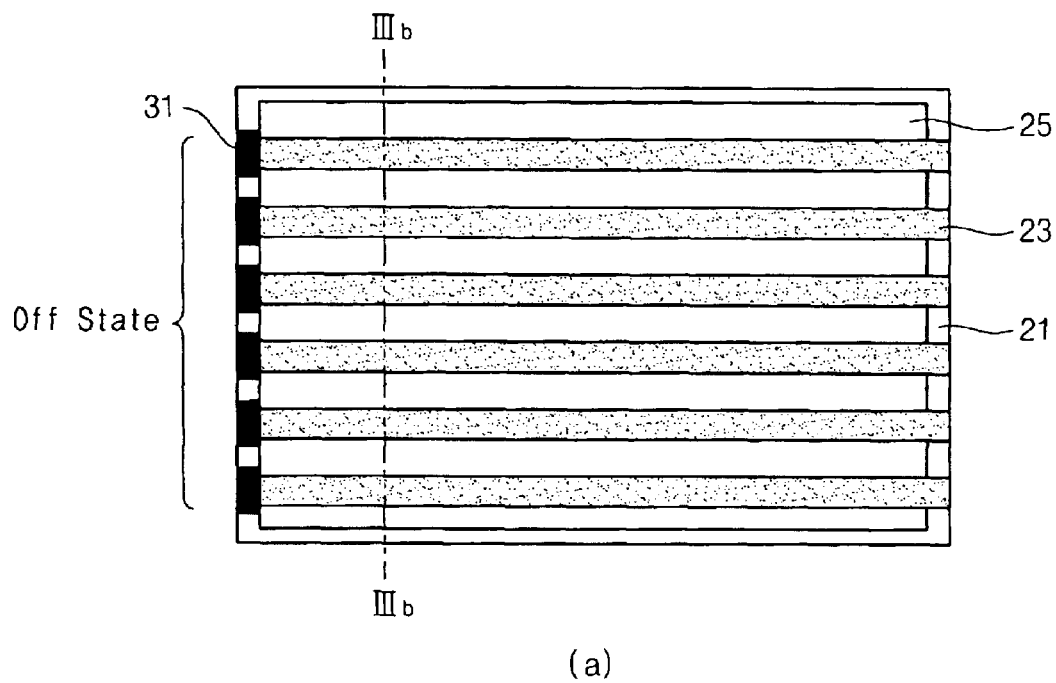
Figure 3:
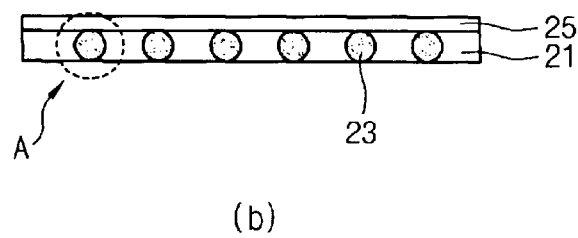
Figure 3:
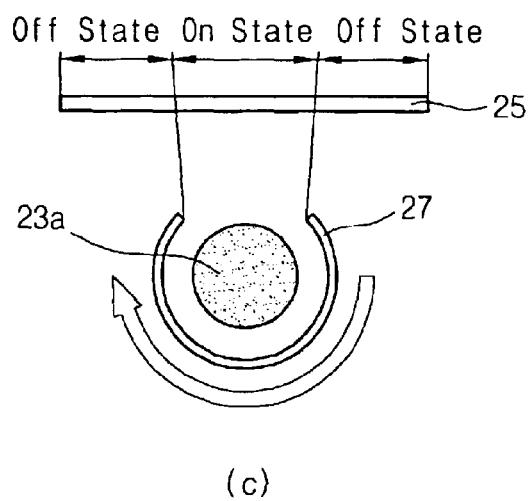

FIG. 3a is a top view of a blink backlight having a reflection plate in accordance with the present invention. FIG. 3b is a cross-sectional view taken along line IIIb—IIIb of FIG. 3a. FIG. 3c is a magnified view of part A of FIG. 3b.

Figure 4:
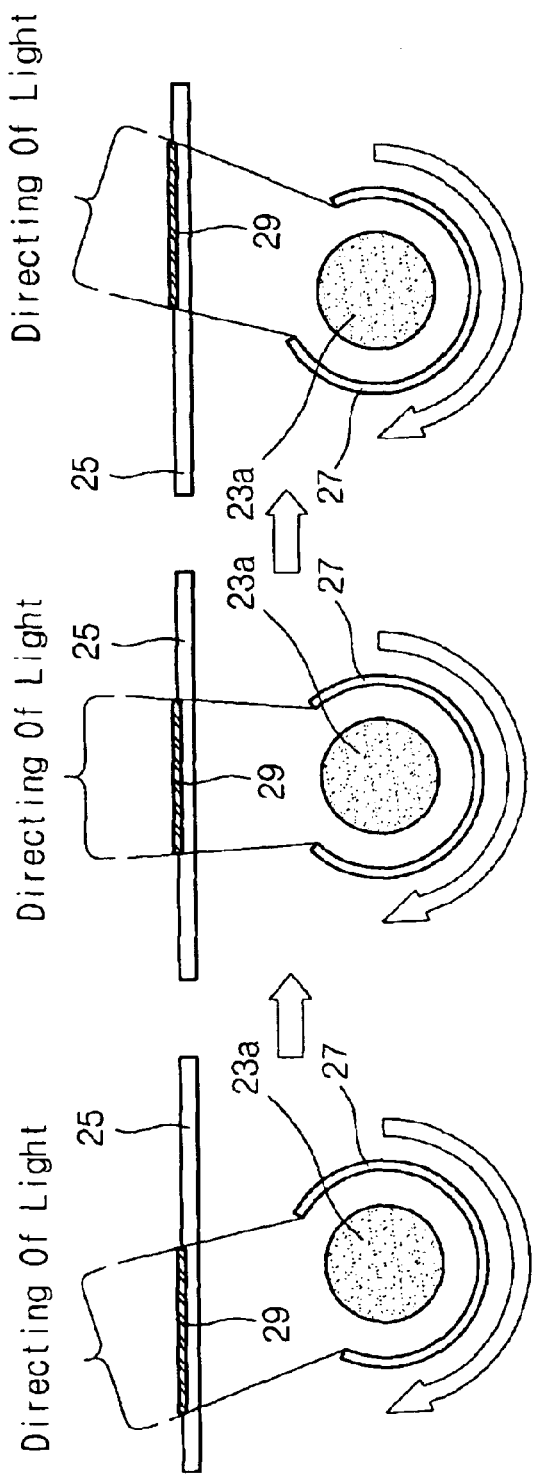
FIG. 4 shows variation in direction of light and display area depending on time, in a blink backlight structure for an LCD according to the present invention.

FIG. 4 shows variation in the direction of light and display area depending on time, in a blink backlight structure for an LCD according to the present invention.

Figure 5:
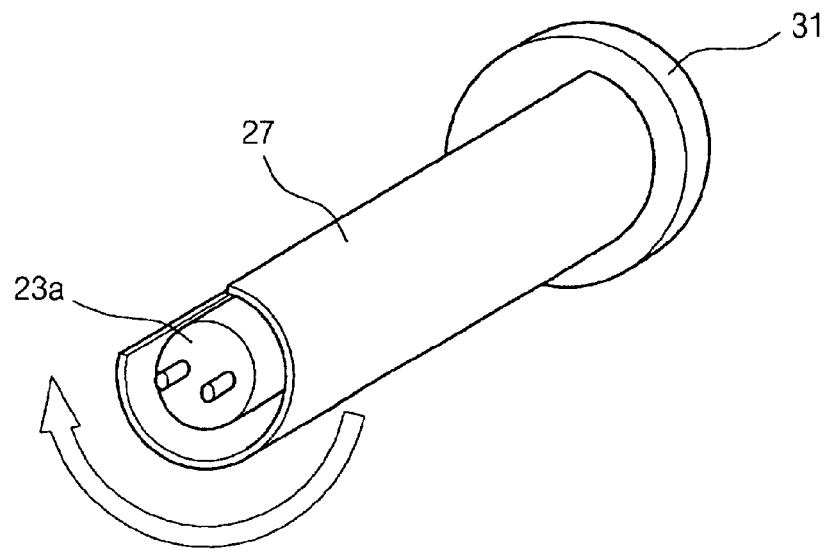
FIG. 5 is perspective view of a blink backlight having a reflection plate in accordance with one embodiment of the present invention.
Figure 6:
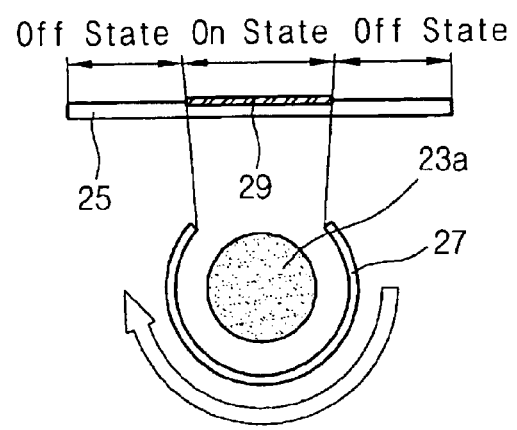
FIG. 6 is a cross-sectional view of a blink backlight having a reflection plate in accordance with another embodiment of the present invention.

Further, FIG. 5 is perspective view of a blink backlight having a reflection plate in accordance with one embodiment of the present invention. FIG. 6 is a cross-sectional view of a blink backlight having a reflection plate in accordance with another embodiment of the present invention.

The present invention proposes a method capable of decreasing the duty time without sacrifice of luminance, in consideration of the fact that a clear moving picture may be obtained by decreasing a duty time in a blink backlight system.

In a backlight unit structure 21 according to the present invention, as shown in FIGS. 3A to 3C and 4–6, the structure 21 has a plurality of lamp units 23 and rotation driver 31 and is disposed below a display panel. Each of the lamp units 23 is provided with a backlight lamp 23a and a reflection plate 27, the reflection plate 27 being spaced a predetermined distance apart from the backlight lamp 23a, and then is turned by a rotation driver 31.

Further, each of the reflection plates 27 is formed integrally with the corresponding backlight lamp 23a so that the reflection plate 27 can rotate together with the backlight lamp 23a. Further, each of the reflection plates 27 surrounding the corresponding backlight lamp 23a has a structure shaped like a partly broken cylinder, that is, has a sectional shape of a perforated circle having an opening through which light can be concentrated and collected on the display panel.

Further, it is important to harmonize a rotation speed of the backlight lamp 23a with a scanning speed of a gate signal. In other words, light of the backlight lamp is concentrated on a pixel synchronized with the signal.

Therefore, the method technically allows the duty time to reduce a scanning time of the gate signal in the blink backlight, so that it is possible to reduce a blur phenomenon of the moving picture and to maximize an efficiency of light. As a result, a luminance can be enhanced.

FIG. 4 shows the variation in the directed light area 29 on the display panel 25 due to the rotation of the backlight lamp 23a and/or the reflection plate 27.

FIGS. 5 and 6 show a blink backlight having a reflection plate according to the present invention in detail, in which the reflection plate 27 is turned separately from the backlight lamp 23a by a rotation driver 31.

That is, a blink backlight 21 is realized by fixing a backlight lamp 23a, and then by rotating a reflection plate 27 together with the rotation driver 31. At this time, a rotation speed of the reflection plate 27 is adapted to match with the scanning speed of the gate.

As mentioned above, with the backlight unit structure for the LCD in accordance with the present invention, the blink backlight having the reflection plate is applied, so that it is possible to improve a response time, to enhance an image quality of the moving picture similarly to the existing CRT, and to obtain a high luminance as well.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A structure for a LCD (Liquid Crystal Display), comprising:
    a display panel;
    at least a lamp disposed under the display panel; and
    at least a reflection plate rotatably disposed around the corresponding lamp and having an opening through which light can be concentrated on the display panel.

2. A structure for a LCD as claimed in claim 1, wherein the lamp and the reflection plate are formed integrally with each other, so that the lamp can rotate together with the corresponding reflection plate while allowing the light to be concentrated on a lower surface of the display panel.

3. A structure for a LCD as claimed in claim 2, wherein a blink rotation speed of the lamp to which the corresponding reflection plate is attached can be synchronized with a scanning speed of a gate signal.

4. A structure for a LCD as claimed in claim 2, further comprising a rotation driver for rotating the lamp and the reflection plate together with each other.

5. A structure for a LCD as claimed in claim 1, wherein the reflection plate is formed separately around the corresponding lamp, so that the reflection plate can rotate separately from the corresponding lamp.

6. A structure for a LCD as claimed in claim 5, wherein the reflection plate has a rotation speed which enables light reflected from the reflection plate to be directed toward a portion directly under a gate line to which the gate signal is applied.

7. A structure for a LCD as claimed in claim 5, further comprising a rotation driver for individually rotating each of the lamp and the reflection plate.

8. A structure for a LCD, comprising:
    a display panel; and
    a plurality of backlight elements under the display panel, each of the backlight elements having a light excluding portion and an opening portion through which light can be concentrated on the display panel, each of the backlight elements having a rotation speed which enables light passing through the opening to be directed toward a portion directly under a gate line to which a gate signal is applied.

9. A structure for a LCD as claimed in claim 8, wherein the rotation speed of the plurality of backlight elements is synchronized with a scanning speed of a gate signal.

10. A structure for a LCD as claimed in claim 8, wherein the light excluding portion of each of the backlight elements is covered by a light reflecting material.

11. A structure for a LCD as claimed in claim 8, further comprising a rotation driver for individually rotating each of the backlight elements.

* * * * *